Figure 1:
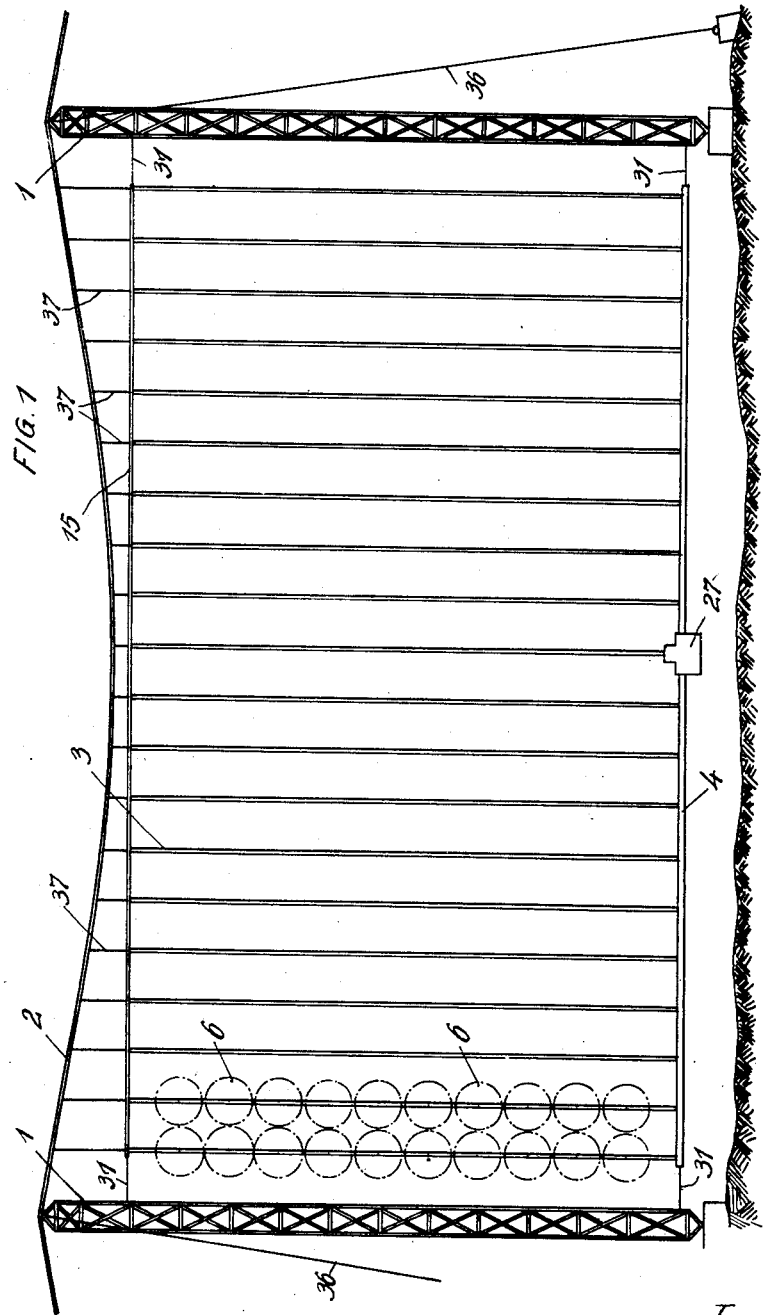

Oct. 22, 1940.   A. BELDIMANO   2,218,867
WIND POWER PLANT
Filed Feb. 5, 1939   3 Sheets-Sheet 1

Inventor:
Alessandro Beldimano

Oct. 22, 1940.  A. BELDIMANO  2,218,867
WIND POWER PLANT
Filed Feb. 5, 1938   3 Sheets-Sheet 2
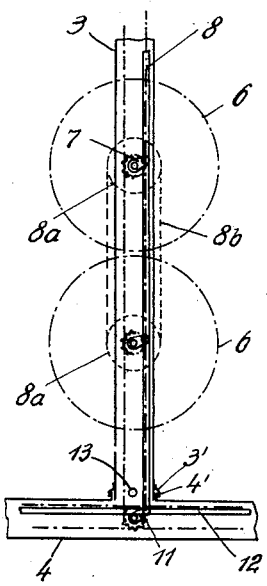
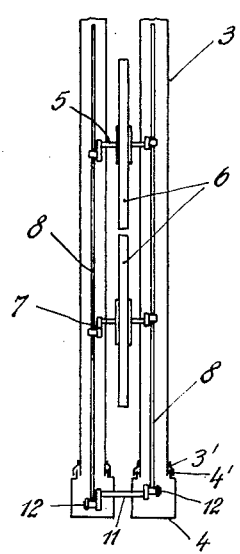
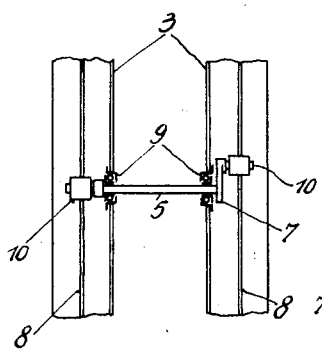
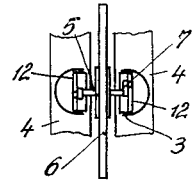
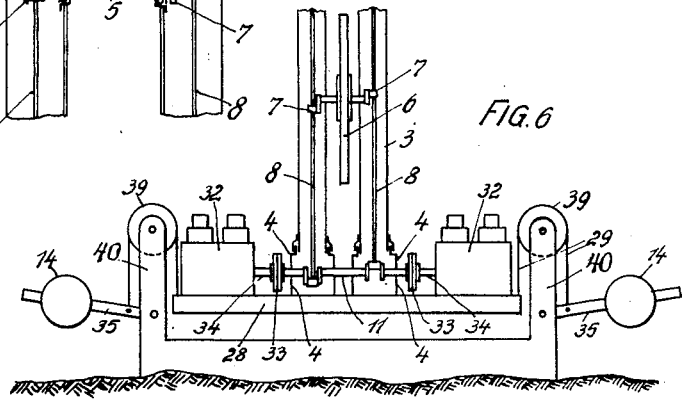
Inventor:
Alessandro Beldimano Oct. 22, 1940.  A. BELDIMANO  2,218,867
WIND POWER PLANT
Filed Feb. 5, 1938  3 Sheets-Sheet 3
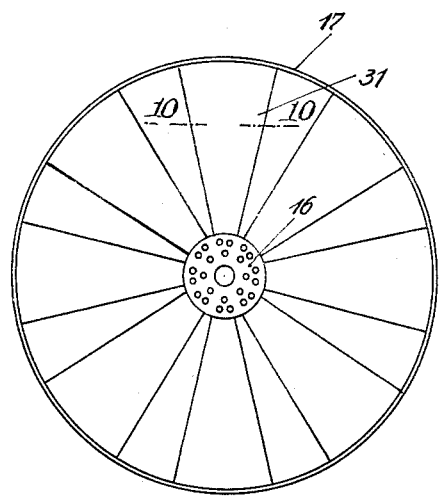
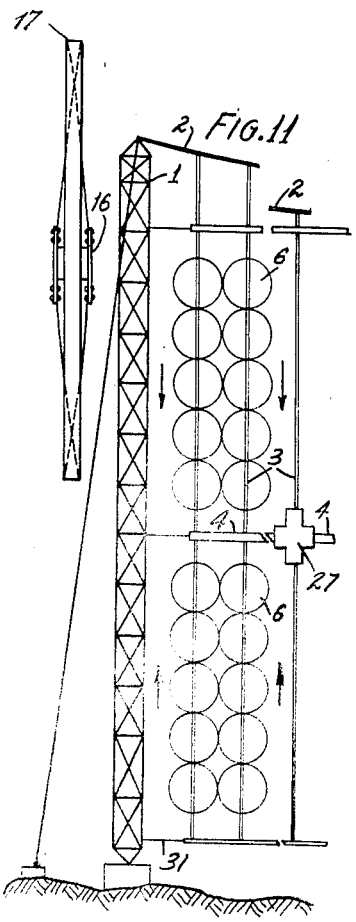
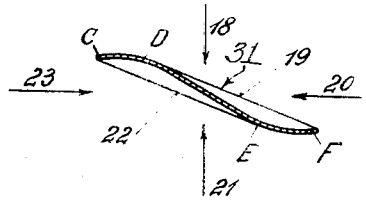
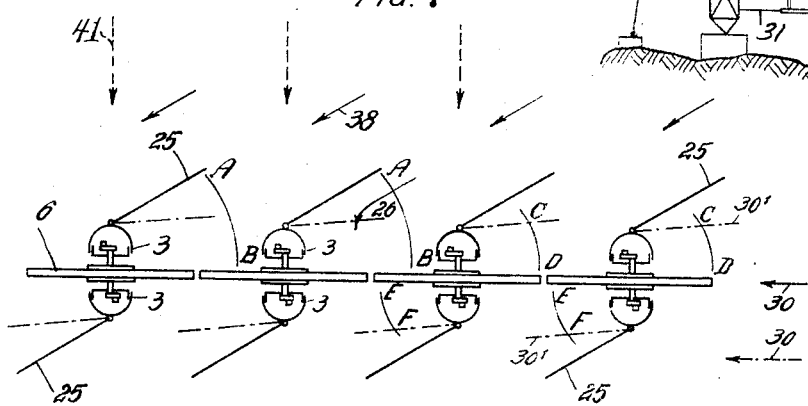
Inventor:
Alessandro Beldimano,
By [signature]
Atty.

Patented Oct. 22, 1940

2,218,867

UNITED STATES PATENT OFFICE 2,218,867

WIND POWER PLANT

Alessandro Beldimano, Rome, Italy

Application February 5, 1938, Serial No. 188,875
In Germany February 6, 1937

6 Claims. (Cl. 170—38)

My invention relates to a wind power plant of the kind comprising a substantially flat vertical supporting structure on which a plurality of wind wheels are mounted for rotation about their axes.

A plant of this general arrangement is described in my prior patent of the United States, No. 1,876,595, Sept. 13, 1932, for "Generating electric power by means of wind."

The installation according to this prior patent comprises a vertically disposed flexible net in whose apertures wind wheels are arranged.

Each wind wheel drives directly a small electric generator, and the electric current generated is supplied to a station where it is collected and/or consumed.

This installation while developing power at high efficiency, is rather complicated since a generator is provided for each wheel, the wheel-and-generator units making up as many power centrals. The generators in the units, though simple and therefore comparatively cheap, involve an initial cost which is prohibitive.

I have found that a more economical plant can be produced if mechanical power transmission from the wind wheels is arranged. Mechanical transmission by chains and sprockets, bevel gears, etc., require that the members between which transmission occurs, should be supported in a practically invariable position with respect to each other. On the other hand, the net, or frame, by which the wind wheels and their transmission members are supported, must possess the possibility of yielding to strong winds so that the plant will not be damaged.

It is an object of my present invention to provide a plant for mechanical power transmission from the wind wheels which combines the rigidity required for such transmission with the flexibility required for avoiding damage by the wind forces.

To this end, I suspend a flexible linear carrier, for instance, a cable, by attaching its ends to elevated fixing points, for instance, to a pair of masts. This linear carrier supports a frame comprising a plurality of substantially rigid girders, or spaced vertical bars, whose upper ends are connected to the flexible carrier, and a girder, also substantially rigid, which is arranged transversely to, and connected with, the first girders or vertical bars, preferably at their lower ends. The wind wheels and the power-transmitting members which are operatively connected to the wheels, are supported by the girders, or rather the frame they make up.

In a preferred embodiment of my invention, as will be described, the wind wheels and their power-transmitting members are supported by the first girders, or vertical bars, and operate together a shaft which is arranged in the further girder extending transversely to the first girders.

Further objects and particulars of the invention will be gathered from the following detailed description with reference to the accompanying drawings, in which by way of example is schematically shown an embodiment of my invention and in which Fig. 1 is a front view of one section of a wind power plant according to this invention, Fig. 2 a schematic front view of a detail showing the connection between a vertical girder 3 and a horizontal girder 4, Fig. 3 a side elevation of the connecting parts shown in Fig. 2, Fig. 4 a plan view of the connecting parts according to Fig. 3, Fig. 5 a side elevation similar to Fig. 3, showing a detail thereof, Fig. 6 a side view, partly in section, of the central power machine according to Fig. 1, Fig. 7 a plan view of a part of the power plant according to Fig. 1, including guide members for the wind wheels, Fig. 8 a front elevation of a wind wheel, Fig. 9 an end elevation of the wind wheel shown in Fig. 8, Fig. 10 an elevation with parts in section of a blade of the wind wheel shown in Fig. 8.

Fig. 11 shows in front elevation a portion of a modified form wherein the transverse girder is positioned midway of the height of the vertical girder.

Identical reference numerals have been used to denote identical parts in the different figures of the drawings.

As will be seen from Fig. 1, masts 1 are arranged at certain intervals and are stayed by guys as at 36 similarly as in the case of radio antenna masts. Stretched between the tops of the masts 1, under suitable mechanical tension, are cables 2, suspended from which, by wire ropes 31, are vertical girders 3 carrying wind wheels 6. Connected to the girders 3 are wire ropes 31 or the like forming stays to hold the girders 3 in their position relative to the masts 1 and to each other and allowing a very small deformation only of the whole structure exposed to the wind, in accordance with the elasticity of the material.

Connected to, and suspended from, the lower end of the girders 3 is a horizontal transverse girder 4 by means of which the power produced in the groups or series of wind wheels 6 arranged on the vertical girders 3 is collected and transmitted to a central power generator or machine indicated in Fig. 1 at 27.

As will be seen from Figures 2, 3 and 4, the vertical girders 3 and the horizontal girders 4 are made of thin profiled sheet metal. This construction of the girders 3 and 4 is an important feature of my invention and renders it possible to produce from thin metal sheets and by means of ordinary bending machines girders having sufficient mechanical strength to carry the wind wheels, the power transmitting members and the wind guiding surfaces or blades which will be hereinafter described.

The single girders 3 may consist of two pressed metal sheets which overlap each other as best shown in Figs. 4 and 7 and which may be held together by screws or other suitable means. Preferably, each girder unit is formed by two oppositely arranged girders 3 between which the wind wheels 6 are positioned, on stub shafts or journals 5 (Fig. 5). Connected to each end of the shafts 5 is a crank 7 (Figs. 5 and 6), the two cranks being arranged to form together an angle of 90° and to transmit the power acting upon them, by means of rods 8. Alternatively, any other suitable power transmitting means, such for example, as chain wheels and chains 8a and 8b, as indicated in Fig. 2 in dotted lines, with roller chains or the like, may be used to connect the several wind wheels and the several series of wind wheels with each other and with the central power machine.

In a preferred form, each wind wheel has a diameter of about 1 meter and consists of light stamped sheet metal parts. The diameter of the circle described by the crank 7 may be about 60 millimeters. The average power produced by one wind wheel of this kind will be in the order of 0.1 H. P., so that a vertical girder 3 comprising ten wind wheels will produce on an average 1 H. P. per year. In other words, 1 H. P. is produced per 1 meter of a wind power plant of this kind. Of course, these statements are approximate and by way of illustration only, for a better understanding of the invention.

The two cranks 7 may be fixed on the shaft ends by a conical face in a similar manner as the pedal cranks of a bicycle. The shaft 5 may be supported in roller bearings, such as indicated at 9 in Fig. 5.

Additional roller bearings 10 are provided to connect the cranks 7 with the rods 8. The two vertical rods 8 which transmit the power through the hollow girders 3 on both sides of the wind wheels 6, as indicated in Fig. 3, terminate at a crank shaft 11 from which the power is transmitted, by horizontal rods 12 (Fig. 2) to the central machine 27 (Fig. 1). It will be understood that the horizontal carrier or girder 4 and the horizontal rods 12 arranged within this girder (Figures 2 and 3) have to be made stronger than the girders 3 and rods 8, in accordance with the greater amount of power to be transmitted.

It will be seen from the drawings that the power transmitting members are enclosed in the hollow girders 3 and 4 respectively which at their joints form projections 3' and 4' overlapping each other and thus forming a relatively tight connection (Figs. 2 and 3). Thus the mechanism is protected against corrosion and the like. The design of the girders in the form of a housing for the power transmitting members is a further special feature of my invention. At the same time this construction enables the lubrication of the power transmitting members and to regain or recover the lubricant irrespective of whether the power transmitting parts consist of toothed wheels and chains, crank drives or the like.

The horizontal girder 4 is hingedly connected to the vertical girders 3 as at 13 (Fig. 2), in order to prevent excessive stresses of certain portions of the girders due to slightly inaccurate assembling of the parts. It is not necessary for the transverse girder 4 to be positioned at the lower end of the girders 3. For instance, as shown in Fig. 11, the girder 4 may be arranged to cross the middle of the vertical girders 3 or any other point thereof. Where the horizontal girder 4 is arranged at equal distances from both ends of the girders 3, the power of one half of the wind wheels only arranged on the girders 3 has to be transmitted to the horizontal rod 12 from both sides of the girder 4. For instance, in case of ten wind wheels per vertical girder 3, the five lower wind wheels transmit their power upwards and the five upper wind wheels transmit their power downwards, to the horizontal rod 12 positioned intermediate the upper and lower half of the series of wind wheels mounted on the respective vertical girder 3.

The wind wheels are so designed that they can be cheaply and easily made of stamped sheet metal. A wind wheel of this kind is shown by way of example in Figs. 8, 9 and 10, illustrating a wind wheel comprising eight blades 31. The blades 31 are riveted or welded between two central hub discs 16 and are held spaced at their periphery by a ring 17 which may also be riveted, welded or otherwise connected to the blades 31. As will be seen from Fig. 10, the blade is formed to have a setting angle of about 30° and a slightly S-shaped cross section. Thus, when the wind acts in the direction indicated by the arrow 18 shown in Fig. 10, the portion of the blade defined by the chord 19 is acted upon, and the wind wheel is rotated in the direction of the arrow 20, while the remaining portion C—D of the blade remains inactive, as far as the driving force produced by the wind is concerned. On the other hand, when the wind acts in the direction of the arrow 21, the portion of the blade defined by the chord 22 is acted upon, the portion E—F remaining inactive so that the wind wheel is rotated in the direction indicated by the arrow 23.

Since the wind greatly varies as to its direction and velocity, provision is made to adapt the wind power station to the direction and velocity of the wind. To this end, the machine or machines, for instance, electric generators which are operated by the series of wind wheels, may be thrown out of operation entirely or partly in accordance with the available wind energy. On the other hand, I have found that when my wind power stations are erected so as to stand with their flat surface normal to the prevailing direction of the wind, the drop of power in case of an oblique wind direction is not very marked. In fact, my wind wheels have a very high efficiency with obliquely acting wind if made with many blades of a relatively low pitch or inclination. I have found that such wheels having many, for instance, 6 to 8 blades, where the wheel has a diameter of one meter and is of relatively low pitch, offer a great resistance against the wind and thus produce a considerable damming or barrage effect. The provision of wind wheels having many blades of low pitch in a stationary wind power station or wind "damming" system arranged perpendicularly to the average wind direction forms a special feature of my present invention.

According to a preferred form, additional means may be provided to utilize obliquely blowing winds with maximum efficiency. To this end, according to Fig. 7, guide blades or surfaces 25 are mounted on the girders 3, in front and to the rear of, the wind wheels 6, so as to be capable of adjustment according to the direction of the wind. As will be seen from Fig. 7, the guide blades 25 are positioned in the direction of the wind indicated by the arrows 38 shown in solid lines. It will be understood that the wind is caught in the sector A—B and more or less turned in the direction indicated in Fig. 7 by the arrow 26.

Where the wind direction is perpendicular to the surface of the wind wheels, as shown by arrow 41, the guide blades 25 are set to the same direction as the wind so as not to hinder the action of the wind upon the wind wheels. If, on the other hand, the wind acts in the direction indicated by the dotted arrows 30, the guide blades 25 are set to the position indicated by the dotted lines 30'. Thus, in the area C—D (Fig. 7) the air-stream striking the guide-blades in position C is deflected by the guide-blades generally in the direction from C to D and has a substantial component perpendicular to wind wheel 6. At the same time, back of girder 3 and the guide-blade in position F, the eddies caused by the air-stream striking the guide-blade create an area of reduced pressure which also imparts torque to turn the wheel. Thus, even in this case the energy of the wind can be utilized with relatively good efficiency. Preferably, I arrange my wind power station so as to stand parallel to the wind direction which at the place where the station is erected, prevails for the least time in a year and has the least total intensity per year, taken on an average.

It will be understood that the guide surfaces 25 can be hingedly mounted to the girders 3 in any suitable manner and without difficulty. Servomotors or automatic controls of any suitable design may be provided in order to adjust the guide surfaces automatically in accordance with the direction of the wind.

Since my wind power station is capable of operation with winds of nearly any direction, at a comparatively good efficiency, it is not necessary to erect the whole system to be turned with its plane in accordance with the direction of the wind, but it may be stationarily erected in a direction ensuring best average efficiency in accordance with the directions and intensities of the wind throughout the year. Thus it is possible to construct wind power stations of this kind extending over many kilometers, for instance, along the sea coast, on flat high plateaus or suitable mountain ridges.

Especially in very large plants of the kind described, I prefer the provision of an automatic lubricating system. To this end, I may provide a pressure oil pump connected, for instance, with the machine or generator 27 and pressing the oil upwardly into a horizontal pipe 15 (Fig. 1) from which it is fed to the tubular channels formed by the vertical hollow girders 3. Thus, the oil acts upon the interior of the girders 3 and lubricates the cranks and bearings, then it is collected in the channels formed by the horizontal girders 4 and after having passed through filters (not shown) and purification it may again circulate through the system.

The energy produced by a battery composed of many series of wind wheels may be utilized in any suitable manner, in the machine indicated at 27 in Fig. 1. For instance, an electric generator, a water pump, an air or gas compressor or the like may be operated by the power plant so as to convert the power produced into any other desirable form of energy. Preferably, the machine 27 is provided with two cranks arranged at an angle of 90° to each other in such a manner that the rods 12 which are moved by the cranks of the wind wheels (Figs. 2, 3, 4) may act directly upon the machine.

Figure 6 illustrates a driving arrangement, comprising a compressor 32, the cylinders of which are arranged in groups of two cylinders each on both sides of the vertical girders 3 and horizontal girders 4 between which the wind wheels 6 are arranged. Through couplings 33, the shafts 34 of the compressor 32 are rotated by the shaft 11 which is identical with the shaft 11 shown in Figs. 2 and 3 and in its turn is rotated by the rods 8 by means of the cranks 7 from the wind wheels 6 and furthermore, by rods 12 (Fig. 3) not shown in Fig. 6, from the wind wheels of the other vertical girders 3 which are not vertically above the compressor 32 but laterally displaced.

As will be seen from Fig. 6, the compressor 32 is mounted on a base plate 28 which in turn is connected with the girders 4 and furthermore suspended by wire ropes 29 or the like, passing over rollers 39 mounted on standards 40 and counterweights 14 mounted on levers 35. Instead of counterweights, springs, pressure cylinders or the like may also be used. In this manner, the compressor 32, while being mounted in a fixed relationship to the driving system of the wind wheels, may be perfectly carried by the ropes 29, thus preventing undue stress of the wind wheel girder system, more particularly of the vertical girders 3 to which the machine is connected and of the cable or wire rope 2 from which the vertical girders 3 are suspended.

Where electric generators are provided, there may also be arranged two generators, i. e., one on each side of the central shaft 11. In case of a single generator, a counterweight has to be provided on the opposite side of the supporting system.

While I have herein shown and described certain preferred embodiments of my invention, I wish it to be understood that I do not confine myself to the precise details herein set forth by way of illustration, since modification and variation may be made without a departure from the spirit of the invention or the scope of the appended claims.

I claim:

1. In a wind power plant, in combination a flexible linear carrier member connected at its ends to elevated fixing points, a plurality of substantially rigid girders suspended from said carrier member, a plurality of wind wheels mounted on said girders for rotation about their axes, a further substantially rigid girder arranged transversely to, and connected with, said first girders, and power-transmitting members operatively connected to said wheels and supported by said substantially rigid girders.

2. In a wind power plant, in combination a flexible carrier member connected at its ends to elevated fixing points, a plurality of girders suspended from said carrier member and formed of sheet metal strips bent to form substantially rigid bodies, a plurality of wind wheels mounted on said girders for rotation about their axes, a further girder formed of at least one sheet metal strip bent to form a substantially rigid body and connected to said first girders transversely relative thereto, and power-transmitting members operatively connected to said wheels and supported by said substantially rigid girders.

3. In a wind power plant, in combination two masts, stays for said masts, a cable extending under mechanical tension between said masts, a plurality of girders substantially vertically suspended from said cable each consisting of sheet metal strips formed into a hollow body, a plurality of wind wheels mounted on each of said girders for rotation about their axes, a horizontal girder connected to said vertical girders and consisting of at least one sheet metal strip formed into a hollow body, a common power transmitting mechanism, and means in said hollow bodies for operatively coupling said wind wheels with each other and with said common power converting machine.

4. In a wind power plant, in combination a flexible linear carrier member connected at its ends to elevated fixing points, a plurality of substantially rigid girders suspended from said carrier member, a plurality of wind wheels mounted on said girders for rotation about their axes, a further substantially rigid girder arranged transversely to, and connected with, said first girders, a common power converting machine substantially rigidly connected with said further girder, a movable base-plate supporting said machine, and means counterbalancing the weight of said base-plate and said machine.

5. A wind power plant according to claim 1, each of said wind wheels comprising radially mounted blades of S-shaped cross-section so mounted as to give the same performance under incident wind current blowing parallel to the axis of said wind wheel in either direction.

6. A wind power plant according to claim 1, said transversely arranged girder being positioned substantially midway of the height of said suspended girders.

ALESSANDRO BELDIMANO.